United States Patent
Salkintzis et al.

(10) Patent No.: US 12,089,053 B2
(45) Date of Patent: *Sep. 10, 2024

(54) SELECTING A NON-3GPP ACCESS NETWORK

(71) Applicant: Lenovo (Singapore) Pte. Ltd., New Tech Park (SG)

(72) Inventors: Apostolis Salkintzis, Athens (GR); Dimitrios Karampatsis, Ruislip (GB); Genadi Velev, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,524

(22) Filed: Feb. 10, 2023

(65) Prior Publication Data
US 2023/0199505 A1 Jun. 22, 2023

Related U.S. Application Data

(63) Continuation of application No. 16/754,047, filed as application No. PCT/EP2018/077364 on Oct. 8, 2018, now Pat. No. 11,589,238.

(51) Int. Cl.
*H04W 12/60* (2021.01)
*H04W 8/24* (2009.01)
(Continued)

(52) U.S. Cl.
CPC .......... *H04W 12/66* (2021.01); *H04W 8/245* (2013.01); *H04W 12/08* (2013.01); *H04W 48/16* (2013.01);
(Continued)

(58) Field of Classification Search
CPC ..... H04W 12/66; H04W 8/245; H04W 12/08; H04W 48/16; H04W 48/18; H04W 60/00; H04W 84/042; H04W 84/12; H04W 88/06
(Continued)

(56) References Cited

U.S. PATENT DOCUMENTS

| | | | |
|---|---|---|---|
| 2014/0204903 A1* | 7/2014 | Kim | H04W 48/18 370/331 |
| 2017/0135031 A1* | 5/2017 | Buckley | H04W 48/18 |
| 2019/0288909 A1* | 9/2019 | Kadiri | H04W 4/70 |

OTHER PUBLICATIONS

3GPP, "3rd Generation Partnership Project; Technical Specification Group Services and System Aspects; Architecture enhancements for non-3GPP accesses (Release 15)", Mar. 2018 (Year: 2018).*

(Continued)

*Primary Examiner* — Mang Hang Yeung
(74) *Attorney, Agent, or Firm* — Kunzler Bean & Adamson

(57) ABSTRACT

Apparatuses, methods, and systems are disclosed for selecting a non-3GPP access network. One apparatus includes a memory coupled to a processor configured to cause the apparatus to generate a list indicating a set of PLMNs and a respective trusted connectivity type associated with each PLMN of the set of PLMNs, select a PLMN from the set of PLMNs, select a trusted connectivity type associated with the selected PLMN, and select a non-3GPP access network from a set of non-3GPP access networks based on the non-3GPP access network supporting the selected trusted connectivity type associated with the selected PLMN and a priority of the non-3GPP access network. Additionally, the processor causes the apparatus to perform a connection procedure with the selected PLMN using the selected trusted connectivity type and via the selected non-3GPP access network.

20 Claims, 9 Drawing Sheets

(51) Int. Cl.
*H04W 12/08* (2021.01)
*H04W 48/16* (2009.01)
*H04W 48/18* (2009.01)
*H04W 60/00* (2009.01)
*H04W 84/04* (2009.01)
*H04W 84/12* (2009.01)

(52) U.S. Cl.
CPC ........... *H04W 48/18* (2013.01); *H04W 60/00* (2013.01); *H04W 84/042* (2013.01); *H04W 84/12* (2013.01)

(58) Field of Classification Search
USPC ............................................ 762/2
See application file for complete search history.

(56) References Cited

OTHER PUBLICATIONS

Panasonic, "Trusted/untrusted non-3GPP access network detection", 3GPP TSG SA WG2 Meeting #65 S2-083537, May 12-16, 2008, pp. 1-4.

3GPP, "3rd Generation Partnership Project; Technical Specification Group Services and System Aspects; Architecture enhancements for non-3GPP accesses (Release 15)", 3GPP TS 23.402 V15.3.0, Mar. 2018, pp. 1-314.

3GPP, "3rd Generation Partnership Project; Technical Specification Group Services and System Aspects; Study on the Wireless and Wireline Convergence for the 5G system architecture (Release 16)", 3GPP TR 23.716 V1.0.0, Sep. 2018, pp. 1-134.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.3.0, Mar. 2018, pp. 1-405.

3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

3GPP, "3rd Generation Partnership Project; Technical Specification Group Services and System Aspects; Procedures for the 5G System; Stage 2 (Release 15)", 3GPP TS 23.502 V15.1.0, Mar. 2018, pp. 1-285.

3GPP, "3rd Generation Partnership Project; Technical Specification Group Core Network and Terminals; Access to the 3GPP Evolved Packet Core (EPC) via non-3GPP access networks; Stage 3 (Release 15)", 3GPP TS 24.302 V15.2.0, Mar. 2018, pp. 1-173.

* cited by examiner

SELECTING A NON-3GPP ACCESS NETWORK

FIELD

The subject matter disclosed herein relates generally to wireless communications and more particularly relates to a UE selecting a non-3GPP access network.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Network Performance ("ANP"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CS S"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("P-GW"), Public Land Mobile Network ("PLMN"), Quality of Service ("QoS"), Quadrature Phase Shift Keying ("QPSK"), Registration Area ("RA"), Radio Access Network ("RAN"), Radio Access Technology ("RAT"), Radio Resource Control ("RRC"), Receive ("RX"), Switching/Splitting Function ("SSF"), Scheduling Request ("SR"), Secure User Plane Location ("SUPL"), Serving Gateway ("S-GW"), Session Management Function ("SMF"), System Information Block ("SIB"), Tracking Area ("TA"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), UE Route Selection Policy ("URSP"), and Worldwide Interoperability for Microwave Access ("WiMAX").

In fifth generation ("5G") wireless communication systems, a non-3GPP access network (notably, a WLAN) may support interfaces with mobile networks (e.g., PLMNs) in order to enable wireless devices (e.g., UEs) to connect to these mobile networks and utilize their services. For example, a WLAN access network may support the N2 interface and the N3 interface (i.e., 3GPP-defined 5GC interfaces) with a PLMN for connecting wireless devices to the 5G core ("5GC") network in this PLMN via WLAN access. In addition, a WLAN access network may support the STa interface and the S2a interface (i.e., 3GPP-defined EPC interfaces) with a PLMN for connecting wireless devices to the Evolved Packet Core ("EPC") network in this PLMN via WLAN access.

BRIEF SUMMARY

Methods for selecting a non-3GPP access network are disclosed. Apparatuses and systems also perform the functions of the methods. One method (e.g., performed by a UE) includes generating a list indicating a set of PLMNs and a respective trusted connectivity type associated with each PLMN of the set of PLMNs, selecting a PLMN from the set of PLMNs, and selecting a trusted connectivity type associated with the selected PLMN. The method includes selecting a non-3GPP access network from a set of non-3GPP access networks based on the non-3GPP access network supporting the selected trusted connectivity type associated with the selected PLMN and a priority of the non-3GPP access network. The method includes performing a connection procedure with the selected PLMN using the selected trusted connectivity type and via the selected non-3GPP access network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
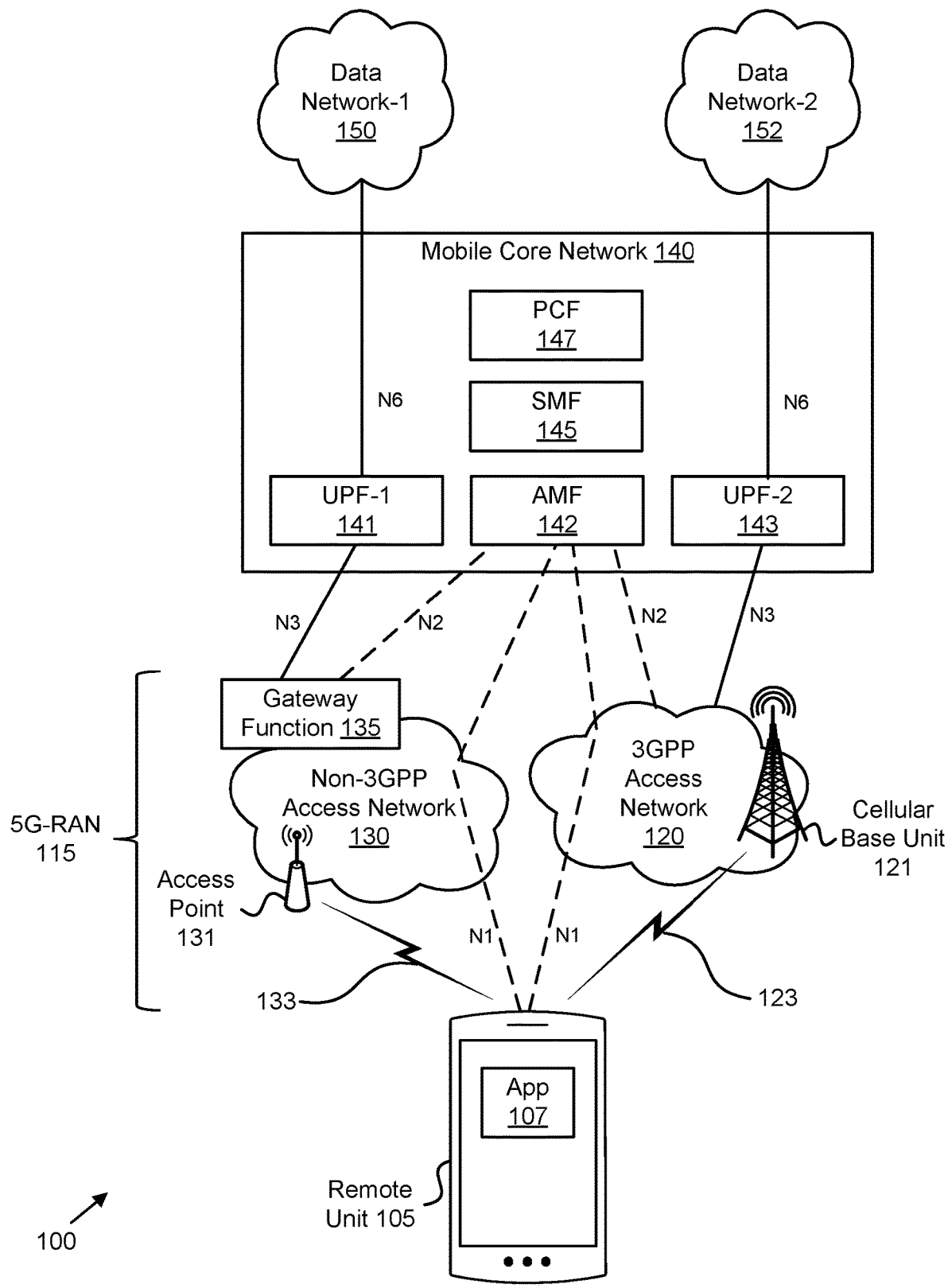
FIG. 1 is a schematic block diagram illustrating one embodiment of a wireless communication system for selecting a non-3GPP access network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for selecting a non-3GPP access network. As mentioned above, a non-3GPP access network (e.g., a WLAN) may support interfaces with mobile networks (e.g., one or more PLMNs) in order to enable wireless devices to connect to these mobile networks and utilize their services. When a wireless device wants to register to a PLMN via a non-3GPP access network, the wireless device requires a method for selecting (a) the PLMN to connect to via non-3GPP access, (b) the core network (EPC or 5GC) in this PLMN to connect to and (c) the non-3GPP access network to connect to that provides connectivity to the selected core network in the selected PLMN.

FIG. 1 depicts a wireless communication system 100 for selecting a non-3GPP access network, according to embodiments of the disclosure. In one embodiment, the wireless communication system 100 includes at least one remote unit 105, a 5G-RAN 115, and a mobile core network 140. The 5G-RAN 115 and the mobile core network form a mobile communication network. The 5G-RAN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host via a network connection with the mobile core network 140. For example, an application 107 (e.g., web browser, media client, telephone application, Voice-over-Internet-Protocol ("VoIP") application) in a remote unit 105 may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and either the first data network 150 or the second data network 152 using the PDU session. Note that the remote unit 105 may establish one or more PDU sessions (or other data connections) with the mobile core network 140. As such, the remote unit 105 may have at least one PDU session for communicating with the first data network 150 and at least one PDU session for communicating with the second data network 152.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a cellular base unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via a gateway function 135. The gateway function 135 provides a gateway between the non-3GPP access network 130 and the mobile core network 140. The gateway function 135 supports connectivity via the "N2" and "N3" interfaces. As depicted, both the 3GPP access network 120 and the gateway function 135 communicate with the AMF 142 using a "N2" interface. The gateway function 135 also communicates with the first UPF 141 using a "N3" interface, while the 3GPP access network 120 communicates with the second UPF 143 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. A gateway function 135 deployed in a trusted non-3GPP access network 120 may be referred to herein as a Trusted Network Gateway Function ("TNGF"). A gateway function 135 deployed in an untrusted non-3GPP access network 120 may be a non-3GPP interworking function ("N3IWF").

In one embodiment, the mobile core network 140 is a 5G core ("5GC") or the evolved packet core ("EPC"), which may be coupled to a data network, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a first UPF ("UPF-1") 141 and a second UPF ("UPF-2") 143. In the depicted embodiment, the first UPF 141 serves the non-3GPP access network 130 and the second UPF 143 serves the 3GPP access network 120. In other embodiments, the first UPF 141 (or second UPF 143) may serve both the 3GPP access network 120 and the non-3GPP access network 130.

The mobile core network 140 also includes multiple control plane functions including, but not limited to, an Access and Mobility Management Function ("AMF") 142 that serves both the 3GPP access network 120 and the non-3GPP access network 130, a Session Management Function ("SMF") 145, and a Policy Control Function ("PCF") 147. In certain embodiments, the mobile core network 140 may also include an Authentication Server Function ("AUSF"), a Unified Data Management function ("UDM"), a Network Repository Function ("NRF") 146 (used by the various NFs to discover and communicate with each other over APIs), or other NFs defined for the 5GC. Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, serving gateway ("S-GW"), PDN gateway ("P-GW"), HSS, and the like.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g. NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

In various embodiments, the mobile core network 140 supports different types of mobile data connections and different types of network slices, wherein each mobile data connection utilizes a specific network slice. The different network slices are not shown in FIG. 1 for ease of illustration, but their support is assumed.

As described in greater detail below, the remote unit 105 may determine to register to the mobile core network 140 via a non-3GPP access network 130. For example, the decision to register to the mobile core network 140 may be triggered by the application 107 requesting to establish a PDU session to the first data network 150 and where policy in the remote unit indicates that this PDU session should preferably be established over non-3GPP access.

In some embodiments, the remote unit 105 determines whether to use a trusted non-3GPP access network or an untrusted non-3GPP access network. Such a decision may be made based on capabilities of the remote unit 105 and connectivity capabilities of the discovers non-3GPP access networks 130. In response to deciding to use a trusted non-3GPP access network, the remote unit 105 determine a non-3GPP access network 130 and a type of connectivity to use to connect to the mobile core network 140.

Figure 2A:
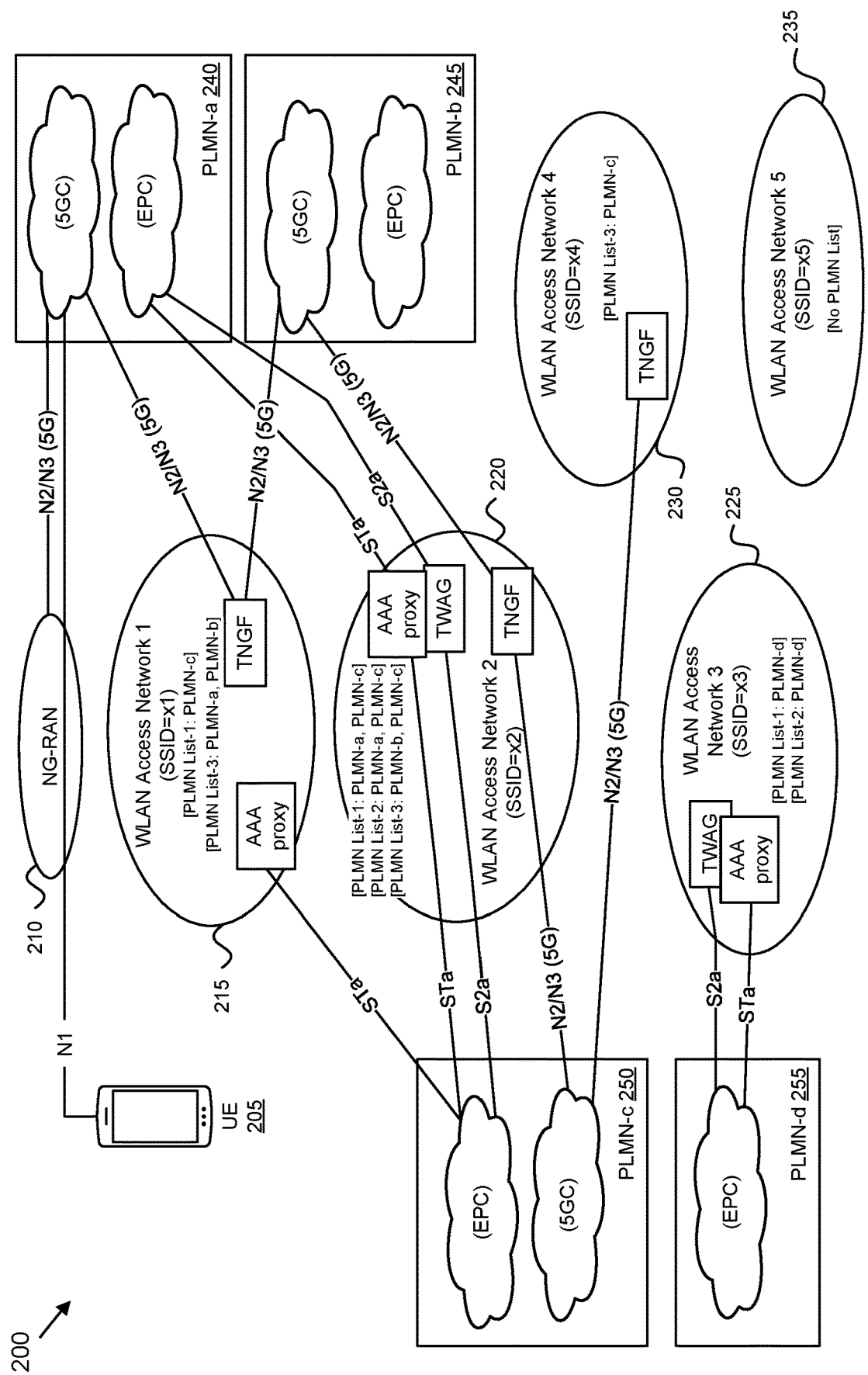
FIG. 2A is a block diagram illustrating one embodiment of a network architecture for selecting a non-3GPP access network.

FIG. 2A depicts a network architecture 200 for selecting a non-3GPP access network, according to embodiments of the disclosure. The network architecture 200 includes a UE 205 which, in the depicted scenario, has discovered five WLAN access networks 215-235. The first WLAN access network 215 is identified by Service Set Identifier ("SSID") 'x1' and contains both a TNGF and a AAA proxy. The second WLAN access network 220 is identified by SSID 'x2' and contains a TNGF, a Trusted WLAN Access Gateway ("TWAG"), and an Authentication, authorization, and accounting ("AAA") proxy. The third WLAN access network 225 is identified by SSID 'x3' and contains both a TWAG and a AAA proxy. The fourth WLAN access network 230 is identified by SSID 'x4' and contains a TNGF. The fifth WLAN access network 235 is identified by SSID 'x5.'

However, the fifth WLAN access network 235 is not a trusted WLAN and does not contain a TNGF, a TWAG, or a AAA proxy. Note that the fifth WLAN access network may connect to one or more of the PLMNs 240-255 using an untrusted connectivity procedure.

The network architecture 200 includes an NG-RAN 210 and four PLMNs: a first PLMN ("PLMN-a") 240, a second PLMN ("PLMN-b") 245, a third PLMN ("PLMN-c") 250, and a fourth PLMN ("PLMN-d") 255. The first PLMN 240 includes a 5GC and an EPC. Note that the first PLMN 240 interworks with the first WLAN access network 215 using "5G connectivity" and interworks with the second WLAN access network 220 using "S2a connectivity." The second PLMN 245 also includes a 5GC and an EPC. Note that the second PLMN 245 interworks with the first WLAN access network 215 and second WLAN access network 220 using "5G connectivity." Note that the EPC in the second PLMN 245 may include an evolved Packet Data Gateway ("ePDG") for connecting with a WLAN using "untrusted connectivity."

The third PLMN 250 includes a 5GC and an EPC. Note that the third PLMN 250 interworks with the first WLAN access network 215 and second WLAN access network 220 using "S2a connectivity" and interworks with the second WLAN access network 220 and fourth WLAN access network 230 using "5G connectivity." The fourth PLMN 255 includes an EPC. Note that the fourth PLMN 255 interworks with the third WLAN access network 225 using "S2a connectivity."

The WLAN access networks 215-235 advertise information about the 3GPP networks (PLMNs) they interwork with, e.g., The WLAN access networks 215-235 advertise information about the 3GPP networks (e.g., PLMNs) they interwork with, e.g., by using the Access Network Query Protocol ("ANQP") protocol. Note that each WLAN may support "S2a connectivity" and/or "5G connectivity" to one or more PLMNs. To connect to a PLMN using a trusted non-3GPP access network, the UE 205 needs to select (a) a WLAN access network, (b) a PLMN, and (c) a connectivity type, i.e. either "S2a connectivity" or "5G connectivity". Note that to connect to a PLMN using an untrusted non-3GPP access network (e.g., fifth WLAN access network 235), the UE 205 needs to select (a) a WLAN access network, (b) a PLMN, and (c) an ePDG or an N3IWF (not shown).

Each WLAN may advertise one or more of: a PLMN List-1, a PLMN List-2, and a PLMN List-3. A PLMN List-1 includes those PLMNs with which "AAA connectivity" is supported. A WLAN supports "AAA connectivity" with a PLMN when it deploys an AAA function that can connect with a 3GPP AAA Server/Proxy in this PLMN, via an STa interface (trusted WLAN to EPC), or via a SWa interface (untrusted WLAN to EPC).

A PLMN List-2 includes PLMNs with which "S2a connectivity" is supported. A WLAN supports "S2a connectivity" with a PLMN when it deploys a TWAG function that can connect with a P-GW in this PLMN, via an S2a interface. A PLMN List-3 includes PLMNs with which "5G connectivity" is supported. A WLAN supports "5G connectivity" with a PLMN when it deploys a TNGF function that can connect with an AMF function and an UPF function in this PLMN via N2 and N3 interfaces, respectively.

In some embodiments, the UE 205 sends an ANQP query to a WLAN requesting "3GPP Cellular Network" information. In response, the WLAN replies with an ANQP response having a "3GPP Cellular Network" information element that contains the PLMN List-1, the PLMN List-2, and/or the PLMN List-3. Note that the PLMN List-3 may be used to indicate interworking with 5G PLMNs.

The UE 205 determines if a WLAN supports "trusted connectivity" to a given PLMN by receiving the PLMN List-2 and the PLMN List-3 advertised by this WLAN. For a given PLMN, if this PLMN is not included in any of the PLMN List-2 and the PLMN List-3 advertised by a WLAN, then the WLAN can only support connectivity to an ePDG or N3IWF in the PLMN (i.e. "untrusted connectivity").

In the depicted embodiment, the first WLAN access network 215 advertises a PLMN List-1 of "PLMN-c" and a PLMN List-3 of "PLMN-a, PLMN-b." The second WLAN access network 220 advertises a PLMN List-1 of "PLMN-a, PLMN-c," a PLMN List-2 of "PLMN-a, PLMN-c," and a PLMN List-3 of "PLMN-b, PLMN-c." The third WLAN access network 225 advertises a PLMN List-1 of "PLMN-d" and a PLMN List-2 of "PLMN-d." The fourth WLAN access network 230 advertises a PLMN List-3 of "PLMN-c." The fifth WLAN access network 235 does not advertise any PLMN list.

Figure 2B:
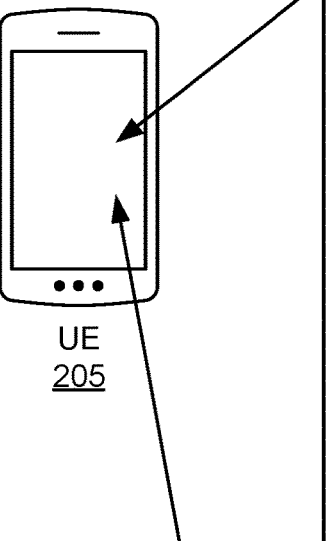
FIG. 2B is a diagram illustrating one example of network lists for selecting a non-3GPP access network.

FIG. 2B depicts one embodiment of the UE 205 generating a list 260 of available non-3GPP access networks and a list 265 of available PLMNs, according to embodiments of the disclosure. From the PLMN Lists-1, PLMN Lists-2, and PLMN Lists-3 advertised by the WLAN access networks 215-235, the UE 205 creates a list 260 of available non-3GPP access networks. As depicted, the list 260 of available non-3GPP access networks includes identifiers for the available non-3GPP access networks (e.g., WLAN access networks 215-235). For each available non-3GPP access network, the list 260 of available non-3GPP access networks indicates those PLMNs for which the WLAN supports trusted connectivity as well as the types of connectivity supported (e.g., S2a connectivity and/or 5G connectivity).

From the information in the list 260 of available non-3GPP access networks, the UE 205 may create a list 265 of available PLMNs. Here, the list 265 of available PLMNs indicates the available PLMNs (e.g., those PLMNs supporting trusted connectivity to an available WLAN) and the types of trusted connectivity supported (e.g., S2a connectivity and/or 5G connectivity). Note that "trusted connectivity" refers to connectivity provided via a trusted non-3GPP access network. "Trusted connectivity" procedures differ from "untrusted" connectivity procedures.

Figure 3:
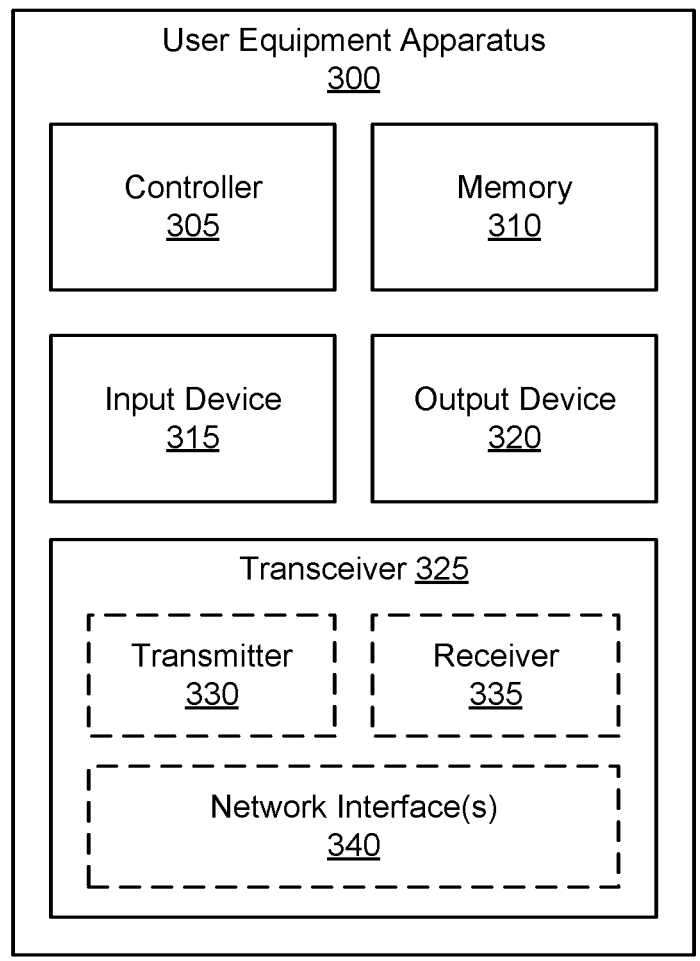
FIG. 3 is a schematic block diagram illustrating one embodiment of a user equipment apparatus for selecting a non-3GPP access network.

FIG. 3 depicts one embodiment of a user equipment apparatus 300 that may be used for determining what type of network connection to establish from an OS-specific connection capability, according to embodiments of the disclosure. The user equipment apparatus 300 may be one embodiment of the remote unit 105. Furthermore, the user equipment apparatus 300 may include a processor 305, a memory 310, an input device 315, an output device 320, a transceiver 325. In some embodiments, the input device 315 and the output device 320 are combined into a single device, such as a touch screen. In certain embodiments, the user equipment apparatus 300 does not include any input device 315 and/or output device 320.

As depicted, the transceiver 325 includes at least one transmitter 330 and at least one receiver 335. Additionally, the transceiver 325 may support at least one network interface 340. Here, the at least one network interface 340 facilitates communication with an eNB or gNB (e.g., using the "Uu" interface). Additionally, the at least one network interface 340 may include an interface used for communications with an UPF, an SMF, and/or a Proxy Call Session Control Function ("P-CSCF").

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In a first implementation, the processor 305 creates a first list of available PLMNs connectable via non-3GPP access networks. Here, the first list indicates one or more trusted connectivity types supported for each PLMN. In some embodiments, creating the first list of includes discovering a plurality of available non-3GPP access networks. In such embodiments, discovering the plurality of available non-3GPP access networks may occur in response to the processor 305 determining to register with a PLMN via non-3GPP access. For example, the processor 305 may decide to register with a PLMN and scan for available non-3GPP access networks (e.g., using the transceiver 325).

Additionally, for each available non-3GPP access network, the processor 305 determines a set of connectable PLMNs and the trusted connectivity type(s) supported by each connectable PLMN in the set. In some embodiments, the processor 305 uses an access network query protocol to acquire a list of PLMNs connectable via each available non-3GPP access network and the trusted connectivity types supported for each PLMN in the list.

The processor 305 selects a first PLMN and a first trusted connectivity type to use to connect to the first PLMN. For example, if the user equipment apparatus 300 is connected to a PLMN via 3GPP access and this PLMN is included in the list of available PLMNs, then the processor 305 selects this PLMN. Moreover, the first trusted connectivity type may be a highest priority connectivity type available to the user equipment apparatus 300. In one embodiment, the "5G connectivity" is the highest priority connectivity type.

The processor 305 creates a second list of available non-3GPP access networks. In some embodiments, the processor 305 creates the second list by discovering a plurality of available non-3GPP access networks and ordering the plurality of non-3GPP access networks into a prioritized list based on a set of WLANSP rules. In certain embodiments, the processor 305 discovers the plurality of available non-3GPP access networks when creating the first list, discussed above. Thus, creating the first list and creating the second list may occur in parallel. In various embodiments, the second list may be ordered based on operating parameters of the plurality of available non-3GPP access networks. For WLAN access networks, the operating parameters may include an SSID, Basic Service Set ("BSS") load, Backhaul bit rate, Backhaul UL/DL load, Roaming partners, Type of hotspot (e.g. private, enterprise, etc.), and the like.

The processor 305 selects a first non-3GPP access network. Here, the first non-3GPP access network is a highest priority available non-3GPP network that supports the first trusted connectivity type to the first PLMN. The processor 305 controls the transceiver 325 to begin a connectivity procedure with the first PLMN (e.g., via the transceiver) using the first trusted connectivity type over the first non-3GPP access network. In various embodiments, beginning a connectivity procedure with the first PLMN using the first trusted connectivity type includes initiating a first type of registration procedure over the first non-3GPP access. Here, the first type of registration procedure is based on the first trusted connectivity type.

In one embodiment, the processor 305 begins the connectivity procedure with the first PLMN (using the first trusted connectivity type) by attaching to an EPC network in the first PLMN via a trusted WLAN access gateway in the first non-3GPP access network. In another embodiment, the processor 305 begins the connectivity procedure with the first PLMN (using the first trusted connectivity type) by registering with a 5GC network in the first PLMN via a TNGF in the first non-3GPP access network.

In various embodiments, the processor 305 selects the first trusted connectivity type using one or more of: a capability of the user equipment apparatus 300 (e.g., the user equipment apparatus 300 may be capable of supporting only "trusted" procedures for registration via non-3GPP access), a configuration of the user equipment apparatus 300 (e.g., when the user equipment apparatus 300 is capable of supporting both the "trusted" and the "untrusted" procedures for registering with a mobile network via non-3GPP access, the user equipment apparatus 300 may be configured to apply first the "trusted" procedures and apply the "untrusted" procedures only when "trusted" procedures fail, e.g., when the user equipment apparatus 300 cannot find a non-3GPP access network that supports trusted access to one or more PLMNs), and operating parameters of the plurality of available non-3GPP access networks. In some embodiments, the one or more trusted connectivity types are selected from at least a first connectivity type supporting connection to an EPC in a PLMN (e.g., "S2a connectivity") and a second connectivity type supporting connection to a 5GC in a PLMN (e.g., "5GC connectivity").

In some embodiments, the processor 305 connects to the first PLMN using a second trusted connectivity type in response to the first list of available PLMNs indicating that a second trusted connectivity type is only supported for the first PLMN, the second trusted connectivity type being different than the first trusted connectivity type. For example, if the available non-3GPP access networks only support "S2a connectivity" to the first PLMN and not "5G connectivity," then the processor 305 may connect to the first PLMN using the "S2a connectivity" type. Note that "S2a connectivity" and "5G connectivity" are both examples of "trusted" connectivity types.

In certain embodiments, the processor 305 may determine that the connection to the first PLMN using the first trusted connectivity type does not support a first type of service and then begin a connectivity procedure to the first PLMN using the second trusted connectivity type. In certain embodiments, the processor 305 may connect to the first PLMN using connectivity over untrusted non-3GPP access network in response to the first list of available PLMNs not containing the first PLMN.

In a second implementation, the processor 305 selects a first PLMN and creates a list of available non-3GPP access networks. In one embodiment, creating the list includes placing the available non-3GPP access networks in priority order. In some embodiments, creating the list of includes the processor 305 discovering a plurality of available non-3GPP access networks. In one embodiment, discovering the plurality of available non-3GPP access networks is triggered by the processor 305 determining to connect to the first PLMN. Creating the list may further include determining, for each available non-3GPP access network, a set of connectable PLMNs and one or more trusted connectivity types supported by each connectable PLMN in the set. In such embodiments, the processor 305 may use an access network query protocol to acquire a list of PLMNs connectable via each available non-3GPP access network and the trusted connectivity types supported for each PLMN in the list.

In some embodiments, the processor 305 orders the plurality of non-3GPP access networks into a prioritized list using a set of WLANSP rules. In some embodiments, the prioritized list may be ordered based on operating parameters of the plurality of available non-3GPP access networks.

The processor 305 determines whether any non-3GPP access network in the list support a connection to the first PLMN using at least one trusted connectivity type from a set of trusted connectivity types. In various embodiments of the second apparatus, the set of trusted connectivity types includes at least a first trusted connectivity type for connecting to an EPC (e.g., "S2a connectivity") and a second trusted connectivity type for connecting to a 5GC (e.g., "5G connectivity").

If there is at least one available non-3GPP access network supporting a connection to the first PLMN using at least one trusted connectivity type from the set of trusted connectivity types, then the processor selects a first non-3GPP access network from the list. Here, the first non-3GPP access network is a highest priority non-3GPP access network that supports a connection to the first PLMN using at least one trusted connectivity type from the set of trusted connectivity types. For example, if the highest ordered non-3GPP access network in the list doesn't support a connection to the first PLMN using "5G connectivity" or "S2a connectivity", then the processor 305 selects the next highest ordered non-3GPP access network in the list that does support a connection to the first PLMN using "5G connectivity" and/or "S2a connectivity."

Otherwise, if no available non-3GPP access network supporting a connection to the first PLMN using at least one trusted connectivity type from the set of trusted connectivity types, then the processor selects a second non-3GPP access network from the first list. Here, the second non-3GPP access network may be a highest priority non-3GPP access network in the first list of available non-3GPP access networks.

The processor 305 controls the transceiver 325 and begins a connectivity procedure with the first PLMN over the selected non-3GPP access network using a first connectivity type. Here, the first connectivity type can be either (1) a trusted connectivity type from the set of trusted connectivity types, or (2) an untrusted connectivity type. In some embodiments, the selected non-3GPP access network is the first non-3GPP access network (e.g., one supporting trusted AN connectivity procedures, such as "5G connectivity" and/or "S2a connectivity"). Here, the processor 305 may select "5G connectivity", if available, and otherwise select "S2a connectivity." In other embodiments, the selected non-3GPP access network is the second non-3GPP access network (e.g., supporting untrusted AN connectivity procedures). Here, the processor 305 selects an ePDG or N3IWF (using existing procedures) and registers to the first PLMN via the selected ePDG or N3IWF. In various embodiments, the processor 305 selects the first connectivity type using at least one of: a capability of the second apparatus, a configuration of the second apparatus, and one or more operating parameters of the plurality of available non-3GPP access networks.

In some embodiments, the processor 305 begins the connectivity procedure with the first PLMN using the first connectivity type by initiating a first type of registration procedure over the selected non-3GPP access, wherein the first type of registration procedure is based on the first connectivity type. In certain embodiments, the processor 305 begins the connectivity procedure with the first PLMN using the first connectivity type by registering with the first PLMN via an untrusted non-3GPP gateway in the second non-3GPP access network. Note that registering with the first PLMN may include the processor 305 "attaching to" an EPC.

In one embodiment, the processor 305 begins a connectivity procedure with the first PLMN over the selected non-3GPP access network using the first connectivity type by attaching to an EPC network in the first PLMN via a trusted WLAN access gateway in the first non-3GPP access network. In another embodiment, the processor 305 begins a connectivity procedure with the first PLMN over the selected non-3GPP access network using the first connectivity type by registering with a 5GC network in the first PLMN via a TNGF in the first non-3GPP access network.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to determining what type of network connection to establish from an OS-specific connection capability, for example storing URSP rules, OS identities, application identifiers, and the like. In certain embodiments, the memory 310 also stores program code and related data, such as an operating system ("OS") or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an Liquid Crystal Display ("LCD"), an Light-Emitting Diode ("LED") display, an Organic LED ("OLED") display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

As discussed above, the transceiver 325 communicates with one or more network functions of a mobile communication network via one or more access networks. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335. In certain embodiments, the one or more transmitters 330 and/or the one or more receivers 335 may share transceiver hardware and/or circuitry. For example, the one or more transmitters 330 and/or the one or more receivers 335 may share antenna(s), antenna tuner(s), amplifier(s), filter(s), oscillator(s), mixer(s), modulator/demodulator(s), power supply, and the like.

In various embodiments, the transceiver 325 is configured to communication with 3GPP access network(s) 120 and the non-3GPP access network(s) 130. In some embodiments, the transceiver 325 implements modem functionality for the 3GPP access network(s) 120 and/or the non-3GPP access network(s) 130. In one embodiment, the transceiver 325 implements multiple logical transceivers using different communication protocols or protocol stacks, while using common physical hardware.

Figure 4:
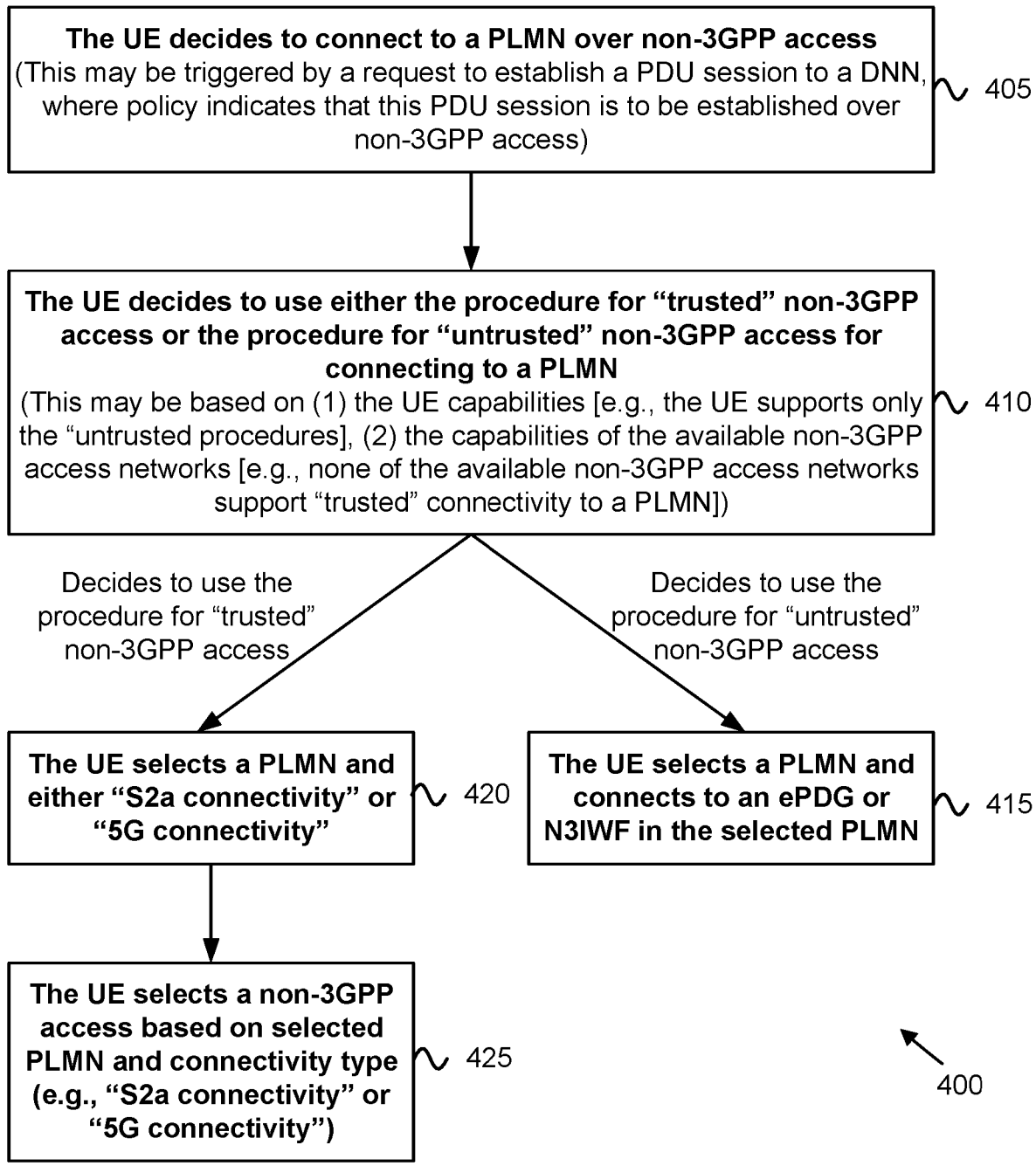
FIG. 4 is a block diagram illustrating one embodiment of a first procedure for selecting a non-3GPP access network.

FIG. 4 depicts a first selection procedure 400 for selecting a non-3GPP access network, according to embodiments of the disclosure. The first selection procedure 400 may be performed by a remote unit 105, the UE 205, and/or the user equipment apparatus 300. The first selection procedure 400 begins with the UE deciding to connect to a PLMN over non-3GPP access (see block 405). In various embodiments, this decision is triggered by a request (e.g., from an application running on the UE) to establish a PDU session to a DNN, where policy (e.g., a UE Route Selection Policy), indicates that this PDU session is to be established over non-3GPP access.

Next, the UE 205 decides whether to use the trusted or the untrusted non-3GPP access procedures (see block 410). In some embodiments, this decision is made based on the UE implementation, and/or based on the UE configuration (e.g. the UE 205 may be configured to try first the trusted non-3GPP access procedure), and/or based on the UE capabilities (e.g. the UE 205 may support only the trusted non-3GPP access procedure), and/or based on the advertised capabilities of the discovered non-3GPP access networks (e.g. none of the available non-3GPP access networks advertises support of "trusted connectivity"), or the like.

If the UE 205 decides to use the untrusted non-3GPP access procedure, then the UE 205 selects a non-3GPP access network, a PLMN and an ePDG or N3IWF in this PLMN (see block 415). For example, the UE 205 may follow N3IWF selection procedure, ePDG selection procedure, Combined N3IWF/ePDG selection procedure, or the like.

However, if the UE 205 decides to use the trusted non-3GPP access procedure, then the UE 205 selects a PLMN and "S2a connectivity" or "5G connectivity" (see block 420) and then selects a non-3GPP access network (see block 425). One example of selecting the non-3GPP access network, the PLMN and "S2a connectivity" or "5G connectivity" is described below. Note that the UE 205 executes the following steps before connecting to a non-3GPP access network. This is different from the untrusted non-3GPP access, where the UE 205 first connects to a non-3GPP access (without using 3GPP-based authentication), obtains Internet Protocol ("IP") configuration and then proceeds to PLMN selection and ePDG/N3IWF selection. In contrast for the case of trusted non-3GPP access, the UE 205 uses 3GPP-based authentication for connecting to a non-3GPP access, so it must first select a PLMN and then attempt to connect to a non-3GPP access. In case of "S2a connectivity", the UE 205 includes the selected PLMN in the decorated NAI and, in case of "5G connectivity", the UE 205 provides the selected PLMN to the TNGF.

For selecting the PLMN, the connectivity type, and the non-3GPP access network after deciding to use trusted non-3GPP access procedure (an implementation of blocks 420 and 425):

Step 1: The UE 205 constructs a list of available PLMNs. This list contains the PLMNs included in the PLMN List-2 and PLMN List-3, advertised by all discovered non-3GPP access networks. For each PLMN the supported type(s) of trusted connectivity is also included. One example of a list of available PLMNs is discussed above with reference to FIG. 2B.

Step 2: The UE 205 selects a PLMN that is included in the list of available PLMNs, as follows: If the UE is connected to a PLMN via 3GPP access and this PLMN is included in the list of available PLMNs, the UE selects this PLMN. However, if the UE is connected to a PLMN via 3GPP access and this this PLMN is not included in the list of available PLMNs, but it is included in the "Non-3GPP access node selection information", then the UE 205 selects this PLMN and executes the Combined ePDG/N3IWF Selection procedure.

Otherwise, if the UE 205 is not connected to a PLMN via 3GPP access, or if the UE 205 is connected to a PLMN via 3GPP access but this PLMN is neither in the list of available PLMNs nor in the "Non-3GPP access node selection information", then the UE 205 determines if it is in its home region/country or not. If the UE 205 determines to be located in its home region/country, then the UE 205 selects the home PLMN ("HPLMN"), if included in the list of available PLMNs. If not included in the list of available PLMNs, then the UE 205 selects an equivalent HPLMN ("E-HPLMN"), if an E-HPLMN is included in the list of available PLMNs. In certain embodiments, if the list of available PLMNs does not include the HPLMN and does not include an E-HPLMN, then the UE 205 stops the procedure and may attempt to connect via untrusted non-3GPP access.

If the UE 205 determines to be located in a visited region/country, then the UE 205 determines if it is mandatory to select a PLMN in the visited region/country. Determining if it is mandatory to select a PLMN in the visited region/country may include the following: if the UE 205 has IP connectivity (e.g., the UE 205 is connected via 3GPP access), the UE 205 sends a Domain Name System ("DNS") query and receives a DNS response that indicates if a PLMN must be selected in the visited region/country. The DNS response includes a lifetime that denotes how long the DNS response can be cached. In certain embodiments, the fully qualified domain name ("FQDN") in the DNS query will be different from the DNS query used for ePDG/N3IWF selection. Also, the DNS response does not need to include a list of PLMNs that support "S2a connectivity" and/or "5G connectivity" because the UE 205 has the list of available PLMNs. Otherwise, if the UE 205 has no IP connectivity (e.g., the UE 205 is not connected via 3GPP access), then the UE 205 may use a cached DNS response that was received in the past, or may use local configuration that indicates which visited countries mandate a PLMN selection in the visited region/country.

If the UE 205 determines that it is not mandatory to select a PLMN in the visited region/country, and the HPLMN or an E-HPLMN is included in the list of available PLMNs, then the UE 205 selects the HPLMN or an E-HPLMN, whichever is included in the list of available PLMNs. Otherwise, the UE 205 selects a PLMN in the visited region/country by considering, in priority order, the PLMNs in the Operator Controlled PLMN Selector list (e.g., in a Universal Subscriber Identity Module ("USIM")). The UE 205 selects the highest priority PLMN in the Operator Controlled PLMN Selector list that is also included in the list of available PLMNs. Note that if the list of available PLMNs does not include a PLMN that is also included in the Operator Controlled PLMN Selector list, then the UE 205 stops the procedure and may attempt to connect via untrusted non-3GPP access.

Step 3: The UE 205 selects the type of trusted connectivity ("S2a connectivity" or "5G connectivity") for connecting to the selected PLMN. In one embodiment, if the list of available PLMNs indicates that both "S2a connectivity" and "5G connectivity" is supported for the selected PLMN, then the UE selects "5G connectivity" since the "5G connectivity" is preferred type of trusted access. In another embodiment, the UE 205 may select between "S2a connectivity" and "5G connectivity" using at least one of: a capability of the apparatus, a configuration of the apparatus, and one or more operating parameters of the plurality of available non-3GPP access networks.

Otherwise, if the list of available PLMNs indicates that only one type of trusted connectivity (either "S2a connectivity" or "5G connectivity") is supported for the selected PLMN, the UE selects this type of trusted connectivity.

Step 4: The UE 205 selects a non-3GPP access network to connect to, as follows: the UE 205 may rank the available non-3GPP access networks in priority order. In case of WLAN access, the UE 205 may construct this prioritized list by using the WLANSP rules. From the prioritized list of non-3GPP access networks, the UE 205 selects the highest priority non-3GPP access network that supports the selected type of trusted connectivity to the selected PLMN.

The following is an example of applying the first selection procedure 400 to the UE 205 shown in FIG. 2A. Assume that the UE 205 selects the second PLMN 245 ("PLMN-b"), for which "S2a connectivity" and "5G connectivity" is supported. The UE 205 may then select "5G connectivity" as the preferred connectivity type. There are two WLAN access networks that support "5G connectivity" to the second PLMN 245: the first WLAN access network 215 and the second WLAN access network 220. The UE 205 then selects either the first WLAN access network 215 and the second WLAN access network 220, whichever has the highest priority in the prioritized list of non-3GPP access networks. Over this WLAN access network, the UE 205 starts the 5GC registration procedure (because "5G connectivity" was selected in step 3), and it provides the selected PLMN to the TNGF.

Note that the first selection procedure 400 decouples the procedures for trusted and untrusted non-3GPP access completely. Advantageously, there is no impact on the existing procedures for ePDG and N3IWF selection. The disadvantage is that the first selection procedure 400 may require a new PLMN selection procedure for trusted non-3GPP access, which leads to additional complexity in the UE 205.

Figure 5:
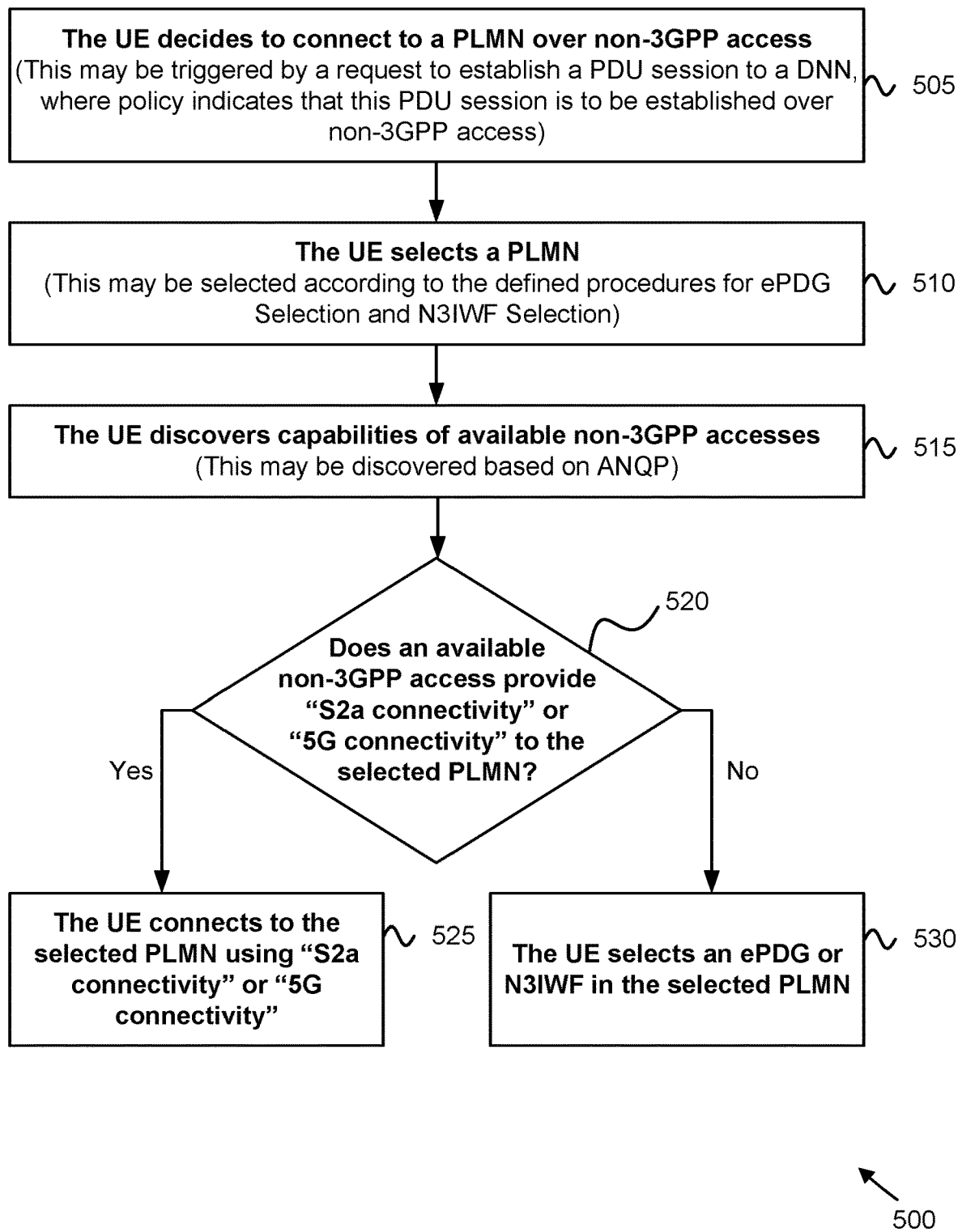
FIG. 5 is a block diagram illustrating one embodiment of a second procedure for selecting a non-3GPP access network.

FIG. 5 depicts a second selection procedure 500 for selecting a non-3GPP access network, according to embodiments of the disclosure. The second selection procedure 500 is an alternative to the first selection procedure 400, discussed above. The second selection procedure 500 may be performed by a remote unit 105, the UE 205, and/or the user equipment apparatus 300.

The second selection procedure 500 begins with the UE deciding to connect to a PLMN over non-3GPP access (see block 505). In various embodiments, this decision is triggered by a request (e.g., from an application running on the UE) to establish a PDU session to a DNN, where policy (e.g., a UE Route Selection Policy), indicates that this PDU session is to be established over non-3GPP access.

Step 1: the UE 205 selects a PLMN, for example according to the defined procedure for ePDG selection and N3IWF selection (see block 510). This means that the UE 205 performs the same PLMN selection for non-3GPP access independently of whether it will use the trusted or the untrusted non-3GPP access procedures to connect to this PLMN. This results in the UE 205 using the prioritized list of PLMNs in the "Non-3GPP access node selection information" for trusted non-3GPP access as well. Note that the UE 205 may need to ignore the "Preference" parameter in the "Non-3GPP access node selection information" when it decides to the procedures for trusted non-3GPP access, because the "Preference" parameter is used to select between ePDG and N3IWF (not applicable for trusted WLAN deployments).

Step 2: Subsequently, the UE 205 discovers (e.g., via ANQP) the interworking capabilities of the available non-3GPP access networks (see block 515) and determines whether any of them supports either "S2a connectivity" or "5G connectivity" to the selected PLMN (see decision block 520).

Step 3A: If at least one non-3GPP access network supports either "S2a connectivity" or "5G connectivity" to the selected PLMN, then the UE 205 may use the procedure for trusted non-3GPP access (see block 525). Accordingly, the UE 205 may perform an "Initial Attach in WLAN on S2a" or perform the 5GC Registration procedure (e.g., where "5G connectivity" is supported).

Step 3B: Otherwise (if no non-3GPP access network supports "S2a connectivity" or "5G connectivity" to the selected PLMN), then the UE 205 applies the procedure for untrusted non-3GPP access to select an ePDG or N3IWF in the selected PLMN (see block 530).

Note that the second selection procedure 500 does not impact the existing ePDG/N3IWF selection procedure. The UE 205 starts ePDG/N3IWF selection procedure and, after PLMN selection, it determines to whether to continue the procedure (with ePDG or N3IWF selection), or to switch to trusted non-3GPP access, i.e. to use either "S2a connectivity" or "5G connectivity".

An advantage to the second selection procedure 500 is that a common PLMN selection algorithm is applied for both untrusted and trusted non-3GPP access. However, a disadvantage of the second selection procedure 500 is that the PLMN selection (in step A) may be carried out with the selection procedure specified for untrusted non-3GPP access and use the "Non-3GPP access node selection information", which may not be applicable to trusted non-3GPP access. In addition, the Preference parameter in the "Non-3GPP access node selection information" may not be applicable to trusted non-3GPP access and, finally, the DNS response that may be received by the UE 205 may include the PLMNs that deploy ePDG and/or N3IWF (information not applicable to trusted non-3GPP).

Figure 6:
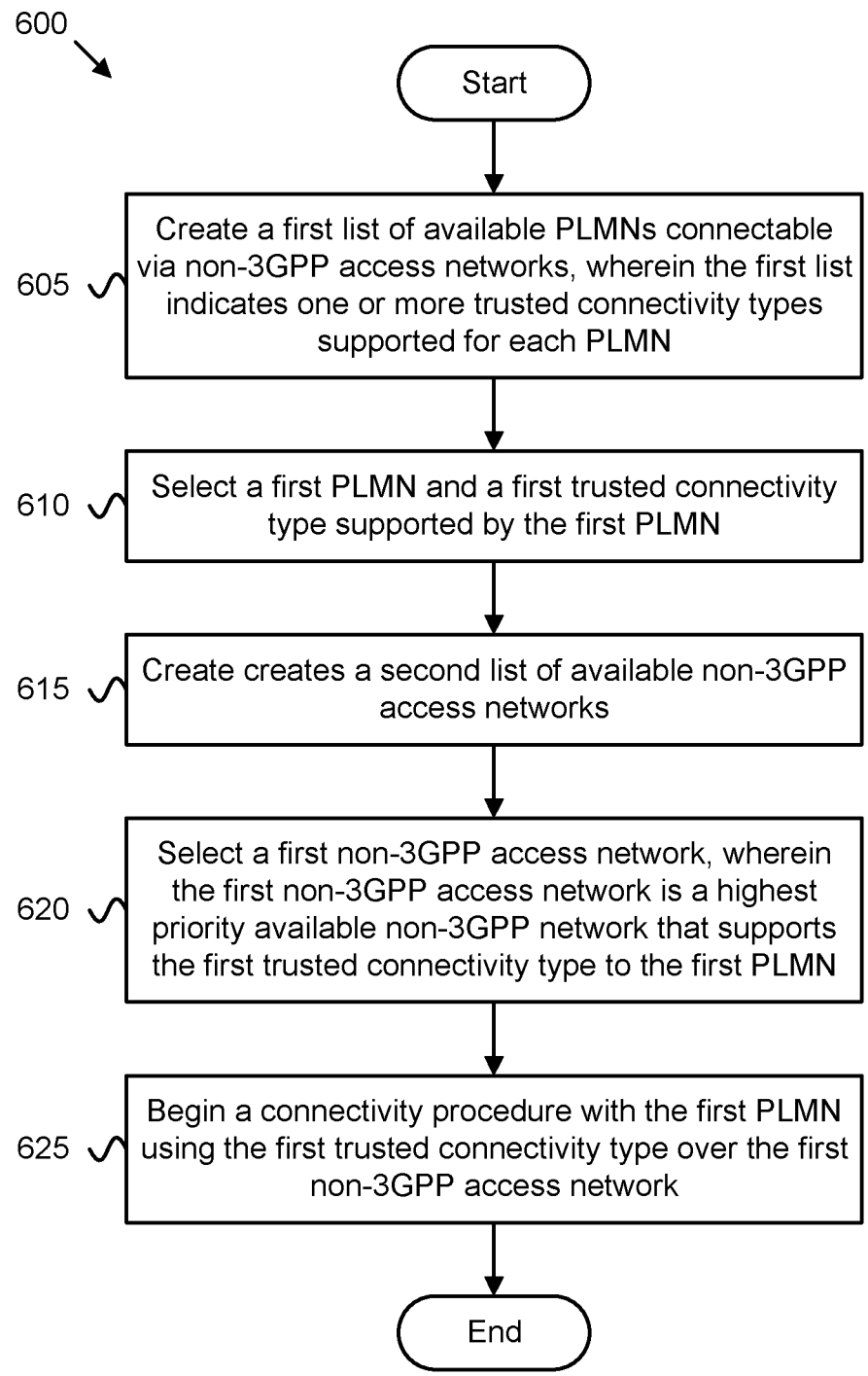
FIG. 6 is a flow chart diagram illustrating one embodiment of a first method for selecting a non-3GPP access network.

FIG. 6 depicts a method 600 for selecting a non-3GPP access network, according to embodiments of the disclosure. In some embodiments, the method 600 is performed by an apparatus, such as the remote unit 105, the UE 205, and/or the user equipment apparatus 300. In certain embodiments, the method 600 may be performed by a processor executing program code, for example, a microcontroller, a microprocessor, a CPU, a GPU, an auxiliary processing unit, a FPGA, or the like.

The method 600 begins and creates 605 a first list of available PLMNs connectable via non-3GPP access networks. Here, the first list indicates one or more trusted connectivity types supported for each PLMN. One example of a first list of available PLMNs connectable via non-3GPP access networks is the list of available PLMNs 265, discussed above with reference to FIG. 1. One example of a first list of available PLMNs connectable via non-3GPP access networks is the list 265 of available PLMNs, discussed above with reference to FIG. 1.

The method 600 includes selecting 610 both a first PLMN and a first trusted connectivity type supported by the first PLMN. Selecting 610 the first PLMN and the first trusted connectivity type may be as described above with reference to FIG. 4.

The method 600 includes creating 615 a second list of available non-3GPP access networks. For example, the UE 205 may create the second list by placing the list 260 of available non-3GPP access networks in priority order.

The method 600 includes selecting 620 a first non-3GPP access network. Here, the first non-3GPP access network is a highest priority available non-3GPP network that supports the first trusted connectivity type to the first PLMN.

The method 600 includes beginning 625 a connectivity procedure with the first PLMN (e.g., via the transceiver) using the first trusted connectivity type over the first non-3GPP access network. The method 600 ends.

Figure 7:
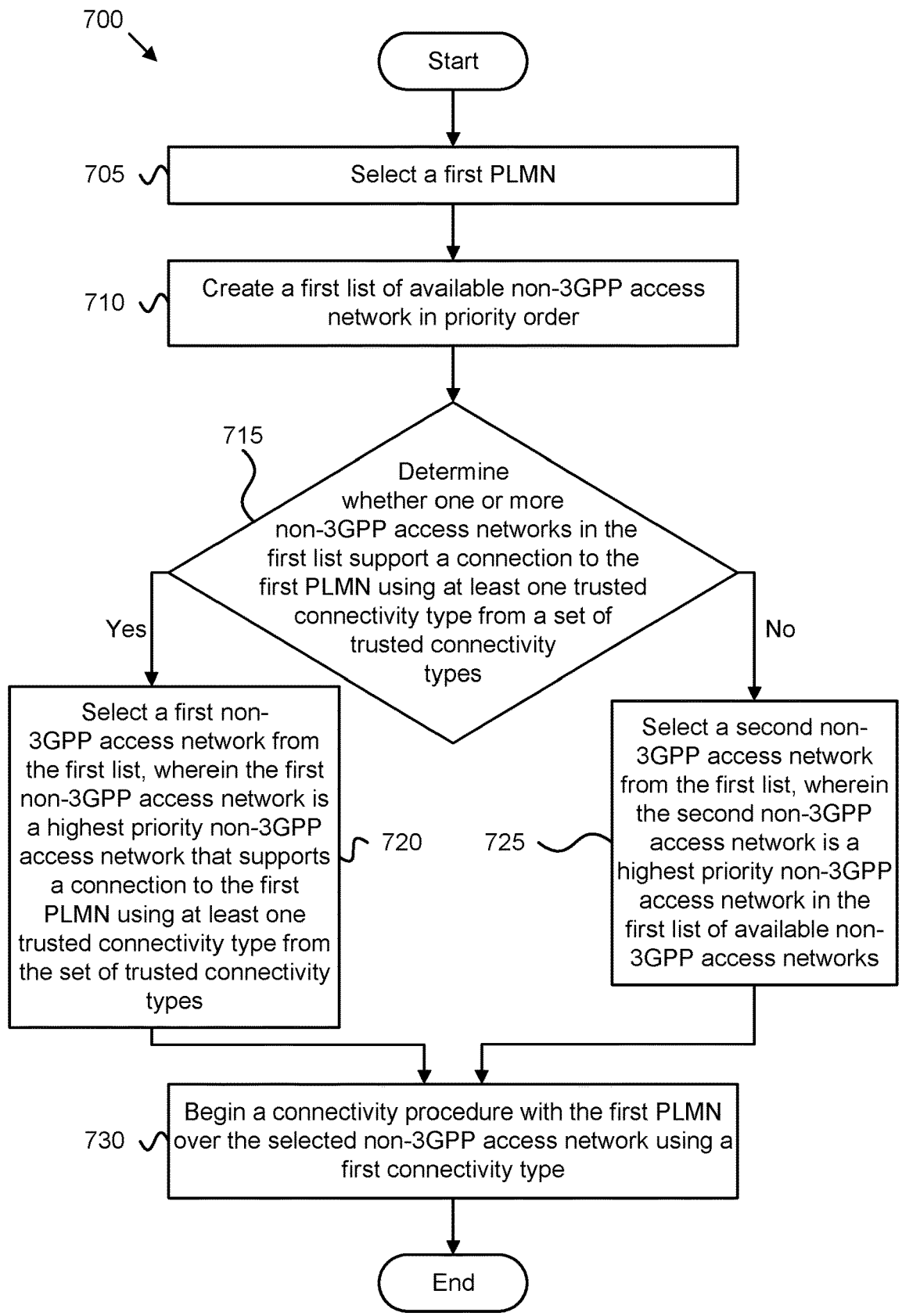
FIG. 7 is a flow chart diagram illustrating one embodiment of a second method for selecting a non-3GPP access network.

FIG. 7 depicts a method 700 for selecting a non-3GPP access network, according to embodiments of the disclosure. In some embodiments, the method 700 is performed by an apparatus, such as the remote unit 105, the UE 205, and/or the user equipment apparatus 300. In certain embodiments, the method 700 may be performed by a processor executing program code, for example, a microcontroller, a microprocessor, a CPU, a GPU, an auxiliary processing unit, a FPGA, or the like.

The method 700 begins and selects 705 a first PLMN. The method 700 includes creating 710 a first list of available non-3GPP access networks. For example, the UE 205 may create the first list by placing the list 260 of available non-3GPP access networks in priority order.

The method 700 includes determining 715 whether one or more non-3GPP access networks in the first list support a connection to the first PLMN using at least one trusted connectivity type from a set of trusted connectivity types.

If at least one available non-3GPP access network supporting a connection to the first PLMN using at least one trusted connectivity type from the set of trusted connectivity types, then the method 700 includes selecting 720 a first non-3GPP access network from the first list. Here, the first non-3GPP access network is a highest priority non-3GPP access network that supports a connection to the first PLMN using at least one trusted connectivity type from the set of trusted connectivity types.

However, if no available non-3GPP access network supports a connection to the first PLMN using at least one trusted connectivity type from the set of trusted connectivity types, then the method 700 includes selecting 725 a second non-3GPP access network from the first list. Here, the second non-3GPP access network is a highest priority non-3GPP access network in the first list of available non-3GPP access networks.

The method 700 includes beginning 730 a connectivity procedure with the first PLMN over the selected non-3GPP access network using a first connectivity type. The method 700 ends.

Figure 8:
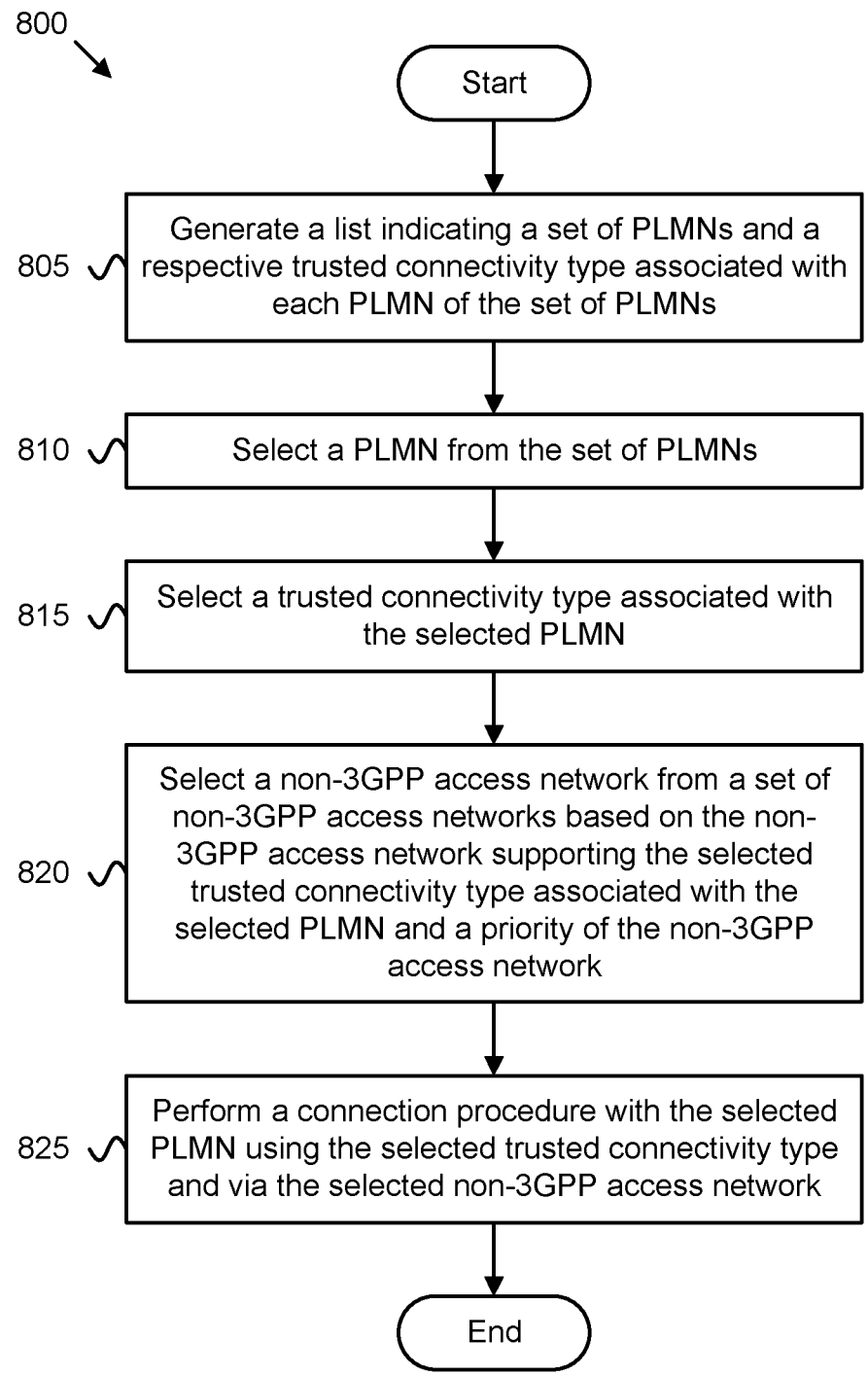
FIG. 8 is a flow chart diagram illustrating one embodiment of a third method for selecting a non-3GPP access network.

FIG. 8 depicts a method 800 for selecting a non-3GPP access network, according to embodiments of the disclosure. In some embodiments, the method 800 is performed by an apparatus, such as the remote unit 105, the UE 205, and/or the user equipment apparatus 300. In certain embodiments, the method 800 may be performed by a processor executing program code, for example, a microcontroller, a microprocessor, a CPU, a GPU, an auxiliary processing unit, a FPGA, or the like.

The method 800 begins with generating 805 a list indicating a set of PLMNs, and a respective trusted connectivity type associated with each PLMN of the set of PLMNs. The method 800 includes selecting 810 a PLMN from the set of PLMNs. The method 800 includes selecting 815 select a trusted connectivity type associated with the selected PLMN.

The method 800 includes selecting 820 a non-3GPP access network from a set of non-3GPP access networks based on the non-3GPP access network supporting the selected trusted connectivity type associated with the selected PLMN and a priority of the non-3GPP access network.

The method 800 includes performing 825 perform a connection procedure with the selected PLMN using the selected trusted connectivity type and via the selected non-3GPP access network. The method 800 ends.

Disclosed herein is a first apparatus for selecting a non-3GPP access network. In various embodiments, the first apparatus may be a user terminal, such as the remote unit 105, the UE 205, and/or the user equipment apparatus 300. The first apparatus includes a processor and a transceiver for communicating with one or more networks (e.g., one or more non-3GPP access networks). The processor creates a first list of available public land mobile networks ("PLMNs") connectable via non-3GPP access networks. Here, the first list indicates one or more trusted connectivity types supported for each PLMN. The processor selects a first PLMN and a first trusted connectivity type supported by the first PLMN. The processor creates a second list of available non-3GPP access networks. The processor selects a first non-3GPP access network. Here, the first non-3GPP access network is a highest priority available non-3GPP network that supports the first trusted connectivity type to the first PLMN. The processor begins a connectivity procedure with the first PLMN (e.g., via the transceiver) using the first trusted connectivity type over the first non-3GPP access network.

In various embodiments of the first apparatus, creating the first list of includes discovering a plurality of available non-3GPP access networks and determining, for each available non-3GPP access network, a set of connectable PLMNs and one or more trusted connectivity types supported by each connectable PLMN in the set. In such embodiments, discovering the plurality of available non-3GPP access networks may occur in response to the processor determining to register with a PLMN via non-3GPP access. In some embodiments, determining the set of connectable PLMNs and the one or more trusted connectivity types supported by each connectable PLMN in the set includes using an access network query protocol to acquire a list of PLMNs connectable via each available non-3GPP access network and the trusted connectivity types supported for each PLMN in the list.

In various embodiments of the first apparatus, creating the second list includes discovering a plurality of available non-3GPP access networks and ordering the plurality of non-3GPP access networks into a prioritized list based on a set of wireless local area network selection policy ("WLANSP") rules. In such embodiments, the second list may be ordered based on operating parameters of the plurality of available non-3GPP access networks.

In various embodiments of the first apparatus, beginning a connectivity procedure with the first PLMN using the first trusted connectivity type includes initiating a first type of registration procedure over the first non-3GPP access. Here, the first type of registration procedure is based on the first trusted connectivity type. In one embodiment, beginning a connectivity procedure with the first PLMN using the first trusted connectivity type includes attaching to an evolved packet core ("EPC") network in the first PLMN via a trusted wireless local area network ("WLAN") access gateway in the first non-3GPP access network. In another embodiment, beginning a connectivity procedure with the first PLMN using the first trusted connectivity type includes registering with a fifth-generation core ("5GC") network in the first PLMN via a trusted non-3GPP gateway function ("TNGF") in the first non-3GPP access network.

In various embodiments of the first apparatus, selecting the first trusted connectivity type is based on at least one of: a capability of the first apparatus, a configuration of the first apparatus, and one or more operating parameters of the plurality of available non-3GPP access networks. In some embodiments, the one or more trusted connectivity types are selected from at least a first connectivity type supporting connection to an evolved packet core ("EPC") in a PLMN (e.g., "S2a connectivity") and a second connectivity type supporting connection to a fifth-generation core ("5GC") in a PLMN (e.g., "5GC connectivity").

In certain embodiments of the first apparatus, the processor connects to the first PLMN using a second trusted connectivity type in response to the first list of available PLMNs indicating that a second trusted connectivity type is only supported for the first PLMN, the second trusted connectivity type being different than the first trusted connectivity type. In certain embodiments of the first apparatus, the processor connects to the first PLMN using connectivity over untrusted non-3GPP access network in response to the first list of available PLMNs not containing the first PLMN. In certain embodiments of the first apparatus, the processor determines that the connection to the first PLMN using the first trusted connectivity type does not support a first type of service and begins a connectivity procedure to the first PLMN using the second trusted connectivity type.

Disclosed herein is a first method for selecting a non-3GPP access network. In various embodiments, the first method may be implemented by a user terminal, such as the remote unit 105, the UE 205, and/or the user equipment apparatus 300. The first method includes creating a first list of available public land mobile networks ("PLMNs") connectable via non-3GPP access networks. Here, the first list indicates one or more trusted connectivity types supported for each PLMN. The first method includes selecting a first PLMN and a first trusted connectivity type supported by the first PLMN. The first method includes creating a second list of available non-3GPP access networks. The first method includes selecting a first non-3GPP access network. Here, the first non-3GPP access network is a highest priority available non-3GPP network that supports the first trusted connectivity type to the first PLMN. The first method includes beginning a connectivity procedure with the first PLMN (e.g., via the transceiver) using the first trusted connectivity type over the first non-3GPP access network.

In various embodiments of the first method, creating the first list of includes discovering a plurality of available non-3GPP access networks and determining, for each available non-3GPP access network, a set of connectable PLMNs and one or more trusted connectivity types supported by each connectable PLMN in the set. In such embodiments, discovering the plurality of available non-3GPP access networks may occur in response to determining to register with a PLMN via non-3GPP access. In some embodiments, determining the set of connectable PLMNs and the one or more trusted connectivity types supported by each connectable PLMN in the set includes using an access network query protocol to acquire a list of PLMNs connectable via each available non-3GPP access network and the trusted connectivity types supported for each PLMN in the list.

In various embodiments of the first method, creating the second list includes discovering a plurality of available non-3GPP access networks and ordering the plurality of non-3GPP access networks into a prioritized list based on a set of wireless local area network selection policy ("WLANSP") rules. In such embodiments, the second list may be ordered based on operating parameters of the plurality of available non-3GPP access networks.

In various embodiments of the first method, beginning a connectivity procedure with the first PLMN using the first trusted connectivity type includes initiating a first type of registration procedure over the first non-3GPP access. Here, the first type of registration procedure is based on the first trusted connectivity type. In one embodiment, beginning a connectivity procedure with the first PLMN using the first trusted connectivity type includes attaching to an evolved packet core ("EPC") network in the first PLMN via a trusted wireless local area network ("WLAN") access gateway in the first non-3GPP access network. In another embodiment, beginning a connectivity procedure with the first PLMN using the first trusted connectivity type includes registering with a fifth-generation core ("5GC") network in the first PLMN via a trusted non-3GPP gateway function ("TNGF") in the first non-3GPP access network.

In various embodiments of the first method, selecting the first trusted connectivity type is based on at least one of: a capability of the user terminal, a configuration of the user terminal, and one or more operating parameters of the plurality of available non-3GPP access networks. In some embodiments, the one or more supported connectivity types are selected from at least a first connectivity type supporting connection to an evolved packet core ("EPC") in a PLMN and a second connectivity type supporting connection to a fifth-generation core ("5GC") in a PLMN.

In certain embodiments, the first method includes connecting to the first PLMN using a second trusted connectivity type in response to the first list of available PLMNs indicating that a second trusted connectivity type is only supported for the first PLMN, the second trusted connectivity type being different than the first trusted connectivity type. In certain embodiments, the first method includes connecting to the first PLMN using connectivity over an untrusted non-3GPP access network in response to the first list of available PLMNs not containing the first PLMN. In certain embodiments, the first method includes determining that the connection to the first PLMN using the first trusted connectivity type does not support a first type of service and beginning a connectivity procedure to the first PLMN using the second trusted connectivity type.

Disclosed herein is a second apparatus for selecting a non-3GPP access network. In various embodiments, the second apparatus may be a user terminal, such as the remote unit 105, the UE 205, and/or the user equipment apparatus 300. The second apparatus includes a processor and a transceiver for communicating with one or more networks (e.g., one or more non-3GPP access networks). The processor selects a first public land mobile network ("PLMN") and creates a first list of available non-3GPP access networks. The processor determines whether one or more non-3GPP access networks in the first list support a connection to the first PLMN using at least one trusted connectivity type from a set of trusted connectivity types. If there is at least one available non-3GPP access network supporting a connection to the first PLMN using at least one trusted connectivity type from the set of trusted connectivity types, then the processor selects a first non-3GPP access network from the first list, where the first non-3GPP access network is a highest priority non-3GPP access network that supports a connection to the first PLMN using at least one trusted connectivity type from the set of trusted connectivity types. However, if no available non-3GPP access network supporting a connection to the first PLMN using at least one trusted connectivity type from the set of trusted connectivity types, then the processor selects a second non-3GPP access network from the first list, where the second non-3GPP access network is a highest priority non-3GPP access network in the first list of available non-3GPP access networks; and the processor begins a connectivity procedure with the first PLMN over the selected non-3GPP access network using a first connectivity type.

In various embodiments of the second apparatus, creating the first list of includes discovering a plurality of available non-3GPP access networks and determining, for each available non-3GPP access network, a set of connectable PLMNs and one or more trusted connectivity types supported by each connectable PLMN in the set. In such embodiments, determining the set of connectable PLMNs and one or more trusted connectivity types supported by each connectable PLMN in the set includes using an access network query protocol to acquire a list of PLMNs connectable via each available non-3GPP access network and the trusted connectivity types supported for each PLMN in the list.

In certain embodiments of the second apparatus, the processor further discovers a plurality of available non-3GPP access networks and orders the plurality of non-3GPP access networks into a prioritized list based on a set of wireless local area network selection policy ("WLANSP") rules. In such embodiments, the prioritized list is ordered based on operating parameters of the plurality of available non-3GPP access networks.

In various embodiments of the second apparatus, the set of trusted connectivity types includes at least a first trusted connectivity type for connecting to an evolved packet core and a second trusted connectivity type for connecting to a fifth-generation packet core. In some embodiments of the second apparatus, the processor selects the first connectivity type using at least one of: a capability of the second apparatus, a configuration of the second apparatus, and one or more operating parameters of the plurality of available non-3GPP access networks.

In various embodiments of the second apparatus, beginning the connectivity procedure with the first PLMN using the first connectivity type includes initiating a first type of registration procedure over the selected non-3GPP access, wherein the first type of registration procedure is based on the first connectivity type. In certain embodiments, beginning a connectivity procedure with the first PLMN over the selected non-3GPP access network using the first connectivity type includes selecting an ePDG or N3IWF in the first PLMN and registering with the first PLMN via the selected ePDG or N3IWF.

In one embodiment, beginning a connectivity procedure with the first PLMN over the selected non-3GPP access network using the first connectivity type includes attaching to an evolved packet core ("EPC") network in the first PLMN via a trusted wireless local area network ("WLAN") access gateway in the first non-3GPP access network. In another embodiment, beginning a connectivity procedure with the first PLMN over the selected non-3GPP access network using the first connectivity type includes registering with a fifth-generation core ("5GC") network in the first PLMN via a trusted non-3GPP gateway function ("TNGF") in the first non-3GPP access network.

Disclosed herein is a second method for selecting a non-3GPP access network. In various embodiments, the second method may be implemented by a user terminal, such as the remote unit 105, the UE 205, and/or the user equipment apparatus 300. The second method includes selecting a first public land mobile network ("PLMN") and creating a first list of available non-3GPP access networks. The second method includes determining whether one or more non-3GPP access networks in the first list support a connection to the first PLMN using at least one trusted connectivity type from a set of trusted connectivity types. If at least one available non-3GPP access network supporting a connection to the first PLMN using at least one trusted connectivity type from the set of trusted connectivity types, then the second method includes selecting a first non-3GPP access network from the first list. Here, the first non-3GPP access network is a highest priority non-3GPP access network that supports a connection to the first PLMN using at least one trusted connectivity type from the set of trusted connectivity types. However, if no available non-3GPP access network supports a connection to the first PLMN using at least one trusted connectivity type from the set of trusted connectivity types, then the second method includes selecting a second non-3GPP access network from the first list. Here, the second non-3GPP access network is a highest priority non-3GPP access network in the first list of available non-3GPP access networks. The second method includes beginning a connectivity procedure with the first PLMN over the selected non-3GPP access network using a first connectivity type.

In various embodiments of the second method, creating the first list of includes discovering a plurality of available non-3GPP access networks and determining, for each available non-3GPP access network, a set of connectable PLMNs and one or more trusted connectivity types supported by each connectable PLMN in the set. In such embodiments, determining the set of connectable PLMNs and one or more trusted connectivity types supported by each connectable PLMN in the set includes using an access network query protocol to acquire a list of PLMNs connectable via each available non-3GPP access network and the trusted connectivity types supported for each PLMN in the list.

In certain embodiments, the second method further includes discovering a plurality of available non-3GPP access networks and orders the plurality of non-3GPP access networks into a prioritized list based on a set of wireless local area network selection policy ("WLANSP") rules. In such embodiments, the prioritized list is ordered based on operating parameters of the plurality of available non-3GPP access networks.

In various embodiments of the second method, the set of trusted connectivity types includes at least a first trusted connectivity type for connecting to an evolved packet core and a second trusted connectivity type for connecting to a fifth-generation packet core. In some embodiments, the second method includes selecting the first connectivity type using at least one of: a capability of the user terminal, a configuration of the user terminal, and one or more operating parameters of the plurality of available non-3GPP access networks.

In various embodiments of the second method, beginning the connectivity procedure with the first PLMN using the first connectivity type includes initiating a first type of registration procedure over the selected non-3GPP access, wherein the first type of registration procedure is based on the first connectivity type. In certain embodiments, beginning a connectivity procedure with the first PLMN over the selected non-3GPP access network using the first connectivity type includes selecting an ePDG or N3IWF in the first PLMN and registering with the first PLMN via the selected ePDG or N3IWF.

In one embodiment, beginning a connectivity procedure with the first PLMN over the selected non-3GPP access network using the first connectivity type includes attaching to an evolved packet core ("EPC") network in the first PLMN via a trusted wireless local area network ("WLAN") access gateway in the first non-3GPP access network. In another embodiment, beginning a connectivity procedure with the first PLMN over the selected non-3GPP access network using the first connectivity type includes registering with a fifth-generation core ("5GC") network in the first PLMN via a trusted non-3GPP gateway function ("TNGF") in the first non-3GPP access network.

Disclosed herein is a third apparatus for selecting a non-3GPP access network. In various embodiments, the third apparatus may be a user terminal, such as the remote unit 105, the UE 205, and/or the user equipment apparatus 300. The third apparatus includes a memory and a processor coupled to the memory, the processor configured to cause the third apparatus to: A) generate a list indicating a set of PLMNs and a respective trusted connectivity type associated with each PLMN of the set of PLMNs; B) select a PLMN from the set of PLMNs; C) select a trusted connectivity type associated with the selected PLMN; D) select a non-3GPP access network from a set of non-3GPP access networks based on the non-3GPP access network supporting the selected trusted connectivity type associated with the selected PLMN and a priority of the non-3GPP access network; and E) perform a connection procedure with the selected PLMN using the selected trusted connectivity type and via the selected non-3GPP access network.

In some embodiments, to generate the list, the processor is configured to cause the third apparatus to: A) discover a plurality of available non-3GPP access networks; and B) determine, for each available non-3GPP access network, a list of connectable PLMNs and the respective trusted connectivity type associated with each PLMN of the list of connectable PLMNs. In certain embodiments, to determine the list of connectable PLMNs and the respective trusted connectivity type associated with each PLMN of the list of connectable PLMNs, the processor is configured to cause the third apparatus to use an access network query protocol to acquire the list of connectable PLMNs and the respective trusted connectivity type associated with each PLMN of the list of connectable PLMNs.

In some embodiments, to perform the connection procedure with the selected PLMN, the processor is configured to initiate a registration procedure over the selected non-3GPP access based on the selected trusted connectivity type. In some embodiments, to select the non-3GPP access network from the set of non-3GPP access networks, the processor is configured to cause the third apparatus to: A) perform a discovery procedure to discover the set of non-3GPP access networks; and B) generate a prioritized list of non-3GPP access networks based on a set of WLANSP rules.

In some embodiments, to perform the connection procedure with the selected PLMN, the processor is configured to cause the third apparatus to attach to an EPC network in the selected PLMN via a trusted WLAN access gateway in the selected non-3GPP access network. In some embodiments, to perform the connection procedure with the selected PLMN, the processor is configured to register with a 5GC network in the selected PLMN via a TNGF in the selected non-3GPP access network.

In some embodiments, the processor is configured to select the trusted connectivity type based on: A) a capability of the third apparatus, B) a configuration of the third apparatus, C) an operating parameter associated with the set of non-3GPP access networks, D) or a combination thereof. In some embodiments, the processor connects to the selected PLMN using a second trusted connectivity type in response to the generated list indicating that the selected PLMN supports the second trusted connectivity type and does not support the selected trusted connectivity type, the second trusted connectivity type being different than the selected trusted connectivity type.

In some embodiments, the processor is configured to cause the third apparatus to: A) determine that a first type of service is unsupported by a connection to the selected PLMN using the selected trusted connectivity type; and B) perform a second connectivity procedure to the selected PLMN using a second trusted connectivity type different than the selected trusted connectivity type.

Disclosed herein is a third method for selecting a non-3GPP access network. In various embodiments, the third method may be implemented by a user terminal, such as the remote unit 105, the UE 205, and/or the user equipment apparatus 300. The third method includes generating a list indicating a set of PLMNs and a respective trusted connectivity type associated with each PLMN of the set of PLMNs, selecting a PLMN from the set of PLMNs, and selecting a trusted connectivity type associated with the selected PLMN. The third method includes selecting a non-3GPP access network from a set of non-3GPP access networks based on the non-3GPP access network supporting the selected trusted connectivity type associated with the selected PLMN and a priority of the non-3GPP access network. The third method includes performing a connection procedure with the selected PLMN using the selected trusted connectivity type and via the selected non-3GPP access network.

In some embodiments, generating the list includes discovering a plurality of available non-3GPP access networks and determining—for each available non-3GPP access network—a list of connectable PLMNs and the respective trusted connectivity type associated with each PLMN of the list of connectable PLMNs. In certain embodiments, determining the list of connectable PLMNs and the respective trusted connectivity type associated with each PLMN of the list of connectable PLMNs includes using an access network query protocol to acquire the list of connectable PLMNs and the respective trusted connectivity type associated with each PLMN of the list of connectable PLMNs.

In some embodiments, performing the connection procedure with the selected PLMN includes initiating a registration procedure over the selected non-3GPP access based on the selected trusted connectivity type. In some embodiments, selecting the non-3GPP access network from the set of non-3GPP access networks includes performing a discovery procedure to discover the set of non-3GPP access networks and generating a prioritized list of non-3GPP access networks based on a set of WLANSP rules.

In some embodiments, performing the connection procedure with the selected PLMN comprises attaching to an EPC network in the selected PLMN via a trusted WLAN access gateway in the selected non-3GPP access network. In some embodiments, performing the connection procedure with the selected PLMN comprises registering with a 5GC network in the selected PLMN via a TNGF in the selected non-3GPP access network.

In some embodiments, selecting the trusted connectivity type is based on one or more of: a capability of the user terminal, a configuration of the user terminal, an operating parameter associated with the set of non-3GPP access networks, or a combination thereof. In some embodiments, the third method includes determining that a first type of service is unsupported by a connection to the selected PLMN using the selected trusted connectivity type and performing a second connectivity procedure to the selected PLMN using a second trusted connectivity type different than the selected trusted connectivity type.

In some embodiments, the third method includes connecting to the selected PLMN using a second trusted connectivity type in response to the generated list indicating that the selected PLMN supports the second trusted connectivity type and does not support the selected trusted connectivity type, the second trusted connectivity type being different than the selected trusted connectivity type.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
at least one memory; and
at least one processor coupled with the at least one memory and configured to cause the UE to:
generate a list of a set of public land mobile networks ("PLMNs") and a respective trusted connectivity type associated with each PLMN of the set of PLMNs;
select a PLMN from the set of PLMNs;
select a trusted connectivity type associated with the selected PLMN;
select a non-3GPP access network from a set of non-3GPP access networks based on the non-3GPP access network supporting the selected trusted connectivity type and a priority of the non-3GPP access network; and
perform a connection procedure with the selected PLMN via the selected non-3GPP access network.

2. The UE of claim 1, wherein to generate the list, the at least one processor is configured to cause the UE to:
discover a plurality of available non-3GPP access networks; and
determine, for each available non-3GPP access network, a list of connectable PLMNs and the respective trusted connectivity type associated with each PLMN of the list of connectable PLMNs.

3. The UE of claim 2, wherein to determine the list of connectable PLMNs and the respective trusted connectivity type associated with each PLMN of the list of connectable PLMNs, the at least one processor is configured to cause the UE to use an access network query protocol to acquire the list of connectable PLMNs and the respective trusted connectivity type associated with each PLMN of the list of connectable PLMNs.

4. The UE of claim 1, wherein to perform the connection procedure with the selected PLMN, the at least one processor is configured to initiate a registration procedure over the selected non-3GPP access based on the selected trusted connectivity type.

5. The UE of claim 1, wherein to select the non-3GPP access network from the set of non-3GPP access networks, the at least one processor is configured to cause the UE to:
perform a discovery procedure to discover the set of non-3GPP access networks; and
generate a prioritized list of non-3GPP access networks based on a set of wireless local area network selection policy ("WLANSP") rules.

6. The UE of claim 1, wherein the at least one processor is configured to select the trusted connectivity type based on:
a capability of the UE,
a configuration of the UE,
an operating parameter associated with the set of non-3GPP access networks,
or a combination thereof.

7. The UE of claim 1, wherein to perform the connection procedure with the selected PLMN, the at least one processor is configured to cause the UE to attach to an evolved packet core ("EPC") network in the selected PLMN via a trusted wireless local area network ("WLAN") access gateway in the selected non-3GPP access network.

8. The UE of claim 1, wherein to perform the connection procedure with the selected PLMN, the at least one processor is configured to register with a fifth-generation core ("5GC") network in the selected PLMN via a trusted non-3GPP gateway function ("TNGF") in the selected non-3GPP access network.

9. The UE of claim 1, wherein the at least one processor connects to the selected PLMN using a second trusted connectivity type in response to the generated list indicating that the selected PLMN supports the second trusted connectivity type and does not support the selected trusted connectivity type, the second trusted connectivity type being different than the selected trusted connectivity type.

10. The UE of claim 1, wherein the at least one processor is configured to cause the UE to:
determine that a first type of service is unsupported by a connection to the selected PLMN using the selected trusted connectivity type; and
perform a second connectivity procedure to the selected PLMN using a second trusted connectivity type different than the selected trusted connectivity type.

11. A method performed by a user equipment ("UE"), comprising:
generating a list of a set of public land mobile networks ("PLMNs") and a respective trusted connectivity type associated with each PLMN of the set of PLMNs;
selecting a PLMN from the set of PLMNs;
selecting a trusted connectivity type associated with the selected PLMN;
selecting a non-3GPP access network from a set of non-3GPP access networks based on the non-3GPP access network supporting the selected trusted connectivity type and a priority of the non-3GPP access network; and
performing a connection procedure with the selected PLMN via the selected non-3GPP access network.

12. The method of claim 11, wherein generating the list comprises:
discovering a plurality of available non-3GPP access networks; and
determining, for each available non-3GPP access network, a list of connectable PLMNs and the respective trusted connectivity type associated with each PLMN of the list of connectable PLMNs.

13. The method of claim 12, wherein determining the list of connectable PLMNs and the respective trusted connectivity type associated with each PLMN of the list of connectable PLMNs comprises using an access network query protocol to acquire the list of connectable PLMNs and the respective trusted connectivity type associated with each PLMN of the list of connectable PLMNs.

14. The method of claim 11, wherein performing the connection procedure with the selected PLMN comprises initiating a registration procedure over the selected non-3GPP access based on the selected trusted connectivity type.

15. The method of claim 11, wherein selecting the non-3GPP access network from the set of non-3GPP access networks comprises:
performing a discovery procedure to discover the set of non-3GPP access networks; and
generating a prioritized list of non-3GPP access networks based on a set of wireless local area network selection policy ("WLANSP") rules.

16. The method of claim 11, wherein selecting the trusted connectivity type is based on:
a capability of the UE,
a configuration of the UE,
an operating parameter associated with the set of non-3GPP access networks,
or a combination thereof.

17. The method of claim 11, wherein performing the connection procedure with the selected PLMN comprises attaching to an evolved packet core ("EPC") network in the selected PLMN via a trusted wireless local area network ("WLAN") access gateway in the selected non-3GPP access network.

18. The method of claim 11, wherein performing the connection procedure with the selected PLMN comprises registering with a fifth-generation core ("5GC") network in the selected PLMN via a trusted non-3GPP gateway function ("TNGF") in the selected non-3GPP access network.

19. The method of claim 11, further comprising connecting to the selected PLMN using a second trusted connectivity type in response to the generated list indicating that the selected PLMN supports the second trusted connectivity type and does not support the selected trusted connectivity type, the second trusted connectivity type being different than the selected trusted connectivity type.

20. The method of claim 11, further comprising:
determining that a first type of service is unsupported by a connection to the selected PLMN using the selected trusted connectivity type; and
performing a second connectivity procedure to the selected PLMN using a second trusted connectivity type different than the selected trusted connectivity type.

* * * * *